C. J. STREAMS.
ANIMAL TRAP.
APPLICATION FILED MAR. 12, 1917.
1,247,171.
Patented Nov. 20, 1917.
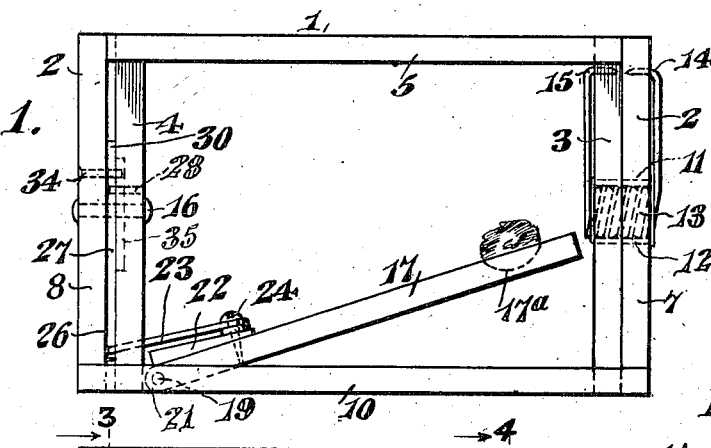
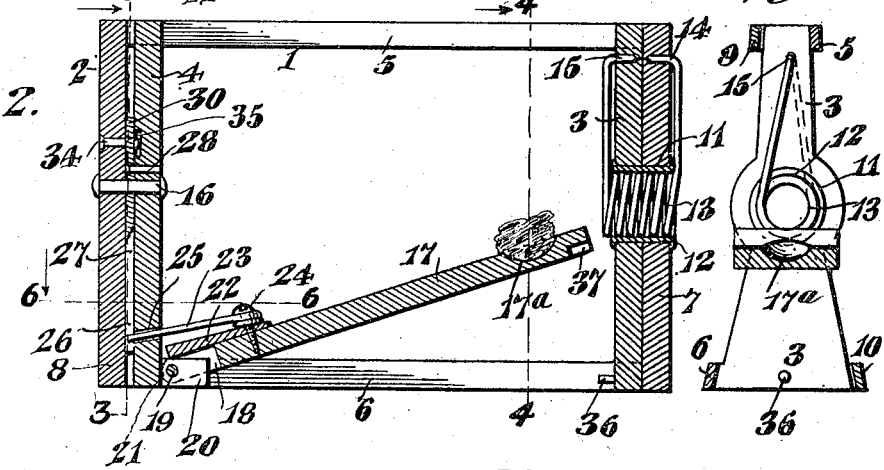
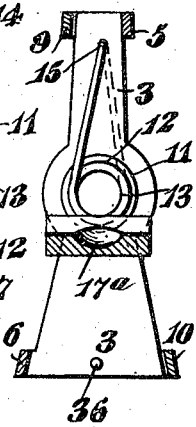
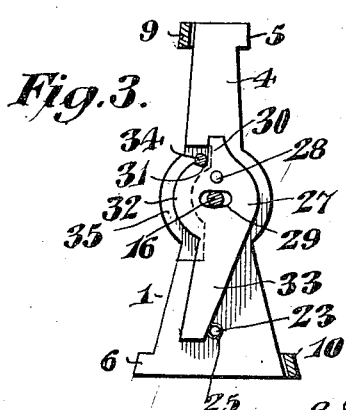
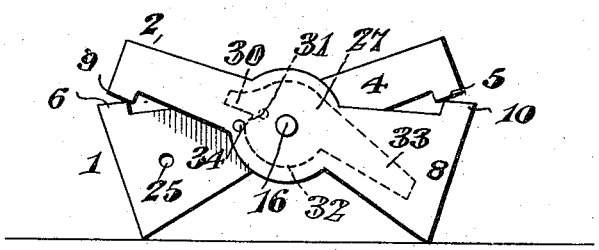
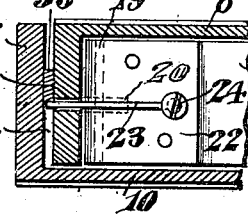
Charles J. Streams
INVENTOR
WITNESSES

UNITED STATES PATENT OFFICE.

CHARLES JOHN STREAMS, OF CREEDE, COLORADO.

ANIMAL-TRAP.

1,247,171.  Specification of Letters Patent.  Patented Nov. 20, 1917.

Application filed March 12, 1917. Serial No. 154,368.

*To all whom it may concern:*

Be it known that I, CHARLES J. STREAMS, a citizen of the United States, residing at Creede, in the county of Mineral and State of Colorado, have invented a new and useful Animal-Trap, of which the following is a specification.

This invention relates to animal traps.

An object of the invention is to provide a trap which when set must be approached by the animal from the side, whereby danger of springing the trap and getting caught by stepping thereupon will be impossible.

Another object of the invention is to provide a construction which can be easily and quickly set without danger of getting the fingers caught therein, and which will at the same time release any animal which may have been previously caught in the trap.

Another object of the invention is to provide certain detail improvements in construction relating to the manner of mounting the spring which causes the trap to operate.

Another object of the invention is to provide a construction by which the trap may be set by drawing the jaws together at the top, thereby tensioning the spring and which can then be set by simply turning the trap over, the trigger operating under the influence of gravity, to lock the trap.

In the drawing:

Figure 1 is a front elevation of the trap, showing the same set.

Fig. 2 is a longitudinal sectional view through the same.

Fig. 3 is a transverse sectional view on the line 3—3 of Fig. 2, looking in the direction of the arrow.

Fig. 4 is a transverse sectional view on the line 4—4 of Fig. 2, looking in the direction of the arrow.

Fig. 5 is an end view of the trap showing the same sprung.

Fig. 6 is a detail horizontal sectional view on the line 6—6 of Fig. 2.

In the embodiment of the invention here illustrated, the trap comprises a pair of inner and outer jaws 1 and 2 of frame like construction. The inner jaw comprises vertically extending end members 3 and 4, which are divergent at their lower ends providing elongated edges for supporting the trap. These end members are connected at the top at one side by a cross strip 5 and at the bottom upon the opposite side by a similar cross strip 6 forming a substantially rectangular frame. The outer jaw or frame member also comprises similar vertically extending end members 7 and 8 connected together at the top upon one side by a cross strip 9 and at the bottom upon the opposite side by a cross strip 10. The cross strips 6 and 9 and 5 and 10 are adapted to move toward each other when the trap is sprung and to engage, as clearly shown in Fig. 5, whereby the animal, whether at one side of the trap or the other, will be caught.

The end members 3 and 7 are provided with central alined openings 11 in which is mounted a cylindrical housing 12 constituting a pivot or bearing for the jaws 1 and 2, receiving a coiled spring 13, the ends of which are connected at 14 and 15 respectively to the end members 3 and 7 of the frames 1 and 2. The coiled spring is so arranged as to normally tend to hold the jaws in the position shown in Fig. 5, or to move their outer edges toward each other to catch the animal. The opposite end members 4 and 8 are pivotally connected together centrally by means of a pivot pin 16.

A trigger or lever 17 is provided with a vertical slot 18 at one end and pivoted adjacent thereto at 19 to a lug 20 fixed to the lower end of the member 4, projecting inwardly therefrom, and arranged to ride within the slot 18 to allow the free movement of the trigger. The end of the trigger remote from the pivot 19 is provided with a recess 17$^a$ adapted to receive food or bait. The pivoted end of the trigger is rounded, as shown at 21 to allow the free movement thereof, and the top adjacent the pivot is provided with a wedge block 22 to which is fastened a trigger pin 23 by means of a suitable screw or other retaining device 24. The pin 23 projects through a hole 25 in the adjacent end member 4 and extends into the space 26 between the end members 4 and 8 for a purpose which will be described more fully hereinafter.

A detent or pendulous lever 27 is pivotally mounted at its upper end to the member 4 at 28 and swings in the space between the end members 4 and 8. An elongated slot 29 is provided therein below the pivot 28 and through this slot extends the pin 16 whereby the detent or lever is allowed a limited amount only of pivotal movement and the pivot pin 16 does not interfere with the swinging thereof. An upwardly projecting lug 30 is provided at the upper portion of the lever 27 and at one side of the lug is a notch 31. Extending downwardly from the notch 31 is a curved cam edge 32. The lower portion of the lever 27 comprises an arm 33 which extends below the opening 25. Projecting inwardly across the space between the members 4 and 8 and attached to the member 8 is a pin or catch 34. This pin also projects into the plane of the member 4, which is recessed as shown at 35 in order to allow the relative movements of the jaws. This pin 34 is so arranged with reference to the detent or lever 27 that when the trap is in sprung position, as shown in Fig. 5, the pin will ride along the cam edge 32 and when the trap is set, it will be sprung into the notch 31, as shown in Fig. 3.

In order to set the trap, all that is necessary is to grasp the cross strips 5 and 9, when in the position shown in Fig. 5, by the fingers and draw the same toward each other, tensioning the spring. Any animal which may have been caught in the trap previously will thereby drop out without it being necessary to touch it with the fingers. As the frames or jaws are drawn together into a position such as shown in Fig. 3, the pin 34 will ride around the cam edge 32 of the detent or lever 27 and will finally spring into the notch 31. A continued movement of the jaws toward each other will cause the pin 34 to engage the lever 33 swinging it and causing the lower arm of the lever 33 to swing to one side of the hole 25, as shown in Fig. 3. It will now be seen that if the trigger 17 happens to be in a horizontal position as it normally tends to be, being heavier at one side of its pivot than at the other, and if the trap is turned upside down, that the end of the lever remote from the pivot will drop down or assume an inclined position, causing the pin 23 to project across the path of the arm 33. When the trap is thus inverted and the trigger is inclined, if the pressure of the fingers is slightly released, the strips 9 and 5 will spread apart and the edge of the arm 33 will move into frictional engagement with the pin 23, retaining the lever or trigger 17 in inclined position and preventing the pin 34 from moving the detent 27 in a counter-clockwise direction, looking at Fig. 3, causing the trap to spring. The trap is now set in upright position as shown in Figs. 1 and 2 and is ready for use. The animal approaches the trap at the side, nibbles at the bait in the recess 17ª, the result being that the trigger 17 will drop back to a horizontal position whereby the pin 23 will move out of engagement with the detent or lever 27, allowing the jaws to spring into the position shown in Fig. 5, catching the animal either between the cross members 6 and 9, or between the cross members 5 and 10. The lower portion of the end member 3 is provided with an inwardly projecting pin 36 which acts as a stop to hold the trigger or lever 17 in a horizontal position, the adjacent end of the trigger being provided with a recess 37 to receive the pin. The block 22 prevents the trigger from swinging upwardly too far.

While I have shown and described one embodiment of my invention, it is to be understood that I do not desire to be limited to the details of construction herein shown and described for obvious modifications will be apparent to anyone skilled in the art.

What is claimed is:—

1. In a trap, frame-like jaws centrally pivoted to each other, means for tensioning the jaws to move the same to trapping position, and means on the jaws for coaction to lock said jaws normally set, and a trigger for action within the jaws for frictional engagement with said means to normally hold the same against releasing movement.

2. In a trap, a pair of jaws of frame like construction having inner and outer end members and cross strips connecting the members at their ends and pivoted together centrally, a spring tending to move the jaws into crossed relation relatively to each other, means mounted between a pair of adjacent end members to retain the jaws in set position, and a trigger movably mounted upon one of said jaws and controlling said means.

3. In a trap, a pair of jaws of frame like construction pivoted centrally together, a spring tending to move the outer edges of said jaws together, means for retaining said jaws in set position, and a trigger pivoted at one end to one of said jaws and frictionally engaging said means to hold the jaws set, said trigger being arranged to drop when touched allowing said means to release the jaws.

4. In a trap, a pair of jaws comprising end members and cross strips connecting the ends of the members and pivoted together centrally, a pendulous lever mounted upon one of the end members, a catch upon the adjacent end member adapted to engage the lever, and a gravity controlled trigger mounted upon one of the jaws and provided with a pin extending into the path of the lever to hold the trap set.

5. In a trap, a pair of jaws comprising end members and cross strips connecting the ends of the members and pivoted together centrally, a pendulous lever mounted upon one of the end members, a catch upon the adjacent end member adapted to engage the lever, a gravity controlled trigger mounted upon one of the jaws and provided with a pin extending into the path of the lever to hold the trap set, and means for limiting the swinging of said lever.

6. In a trap, a pair of jaws pivoted to each other, a spring tending normally to move the outer edges of said jaws toward each other, a pendulous lever mounted between the jaws, a catch fixed to one of said jaws and lying in the path of one end of said lever, and a trigger pivoted at one end and having a pin thereon projecting into the path of the opposite end of said lever.

7. In a trap, a pair of jaws centrally pivoted to each other and each having end members and cross strips connecting the end members forming a frame, a trigger pivoted at one end and provided with a pin projecting through one of the end members into the space between the end members, a pendulous lever pivoted to one of said end members and provided at its upper end with a lug and an adjacent notch and at its lower end with a downwardly projecting arm adapted to project below said opening, and a catch engaging said pendulous lever and adapted to spring into said notch and engage the lug.

8. In a trap, a pair of jaws pivoted together centrally and comprising end members and cross strips connecting the end members, a trigger pivoted at one end to the lower end of one of the end members of the inner jaw and provided with a pin projecting through the end member across the space between the adjacent end members, a pendulous lever pivoted to one of the end members between the end members and comprising an upper lug, a notch adjacent to said lug, a curving cam edge merging with the notch and a downwardly projecting arm extending below the pin of said trigger lever, a catch upon one of the end members engaging the cam edge of said lever and adapted to engage said notch, said trap being invertible to cause one end of the trigger to drop moving its pin into the path of said lever whereby when the parts are allowed to spring slightly apart by a slight release of the fingers, the lower arm of said lever will engage the pin of the trigger and prevent the catch from sliding out of said notch and thereby spring the trap.

9. In a trap, a pair of jaws of frame like construction comprising inner and outer end members and cross strips connecting the ends of the members, pivot pins connecting the jaws centrally and extending through said end members, a pendulous lever pivoted to one of said end members between an adjacent pair of the same and at a point above the pivot pin of that pair and having a slot through which said pin passes whereby the swinging of the lever is limited, a catch upon the adjacent end member adapted to engage said lever and a gravity controlled trigger mounted upon one of the jaws and provided with a pin extending into the path of the lever to hold the trap set.

10. In a trap, a pair of jaws comprising inner and outer end members pivoted together, said end members being provided with centrally alined openings, a pivot pin extending through one pair of said alined openings, and a cylindrical housing extending through the other pair of alined openings and constituting a bearing or pivot, and a coiled spring mounted within said housing and provided with ends engaging the adjacent end members of the jaws.

11. In a trap, jaws pivotally connected one within the other for trapping action on either side of the pivotal axis thereof, a spring for moving the jaws to trapping position, a pendulous member working between the adjacent ends of the jaws for normally holding the same set against the tension of the spring, and means for supporting bait and movable in the plane of said jaws when set for releasing the member.

In testimony, that I claim the foregoing as my own, I have hereto affixed my signature in the presence of two witnesses.

CHARLES JOHN STREAMS.

Witnesses:
JULIA A. SLAGHT,
ANNA MARIE COLLINS.

Copies of this patent may be obtained for five cents each, by addressing the "Commissioner of Patents, Washington, D. C."